US 6,728,105 B2

(12) United States Patent
Tanaka (10) Patent No.: US 6,728,105 B2
(45) Date of Patent: Apr. 27, 2004

(54) ELECTRONIC APPARATUS HAVING A HEAT CONDUCTING SHEET THAT PROMOTE HEAT RADIATION FROM A MEMORY MODULE

(75) Inventor: Hideaki Tanaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/321,563

(22) Filed: Dec. 18, 2002

(65) Prior Publication Data

US 2003/0169568 A1 Sep. 11, 2003

(30) Foreign Application Priority Data

Mar. 7, 2002 (JP) ........................................ 2002-062359

(51) Int. Cl.[7] ................................................. H05K 7/20
(52) U.S. Cl. ...................... 361/704; 361/695; 361/719; 174/16.1; 174/16.3; 165/80.2; 165/185
(58) Field of Search ................................. 361/687–690, 361/694, 695, 704, 707, 715, 713–720; 257/706, 707, 717, 718; 174/16.1, 16.3; 165/80.1, 80.2, 80.3, 185

(56) References Cited

U.S. PATENT DOCUMENTS

| 5,424,913 | A | * | 6/1995 | Swindler ..................... 361/687 |
| 5,726,858 | A | * | 3/1998 | Smith et al. ................. 361/705 |
| 5,835,348 | A | * | 11/1998 | Ishida ......................... 361/699 |
| 5,969,940 | A | * | 10/1999 | Sano et al. .................. 361/687 |
| 6,002,587 | A | * | 12/1999 | Shusa et al. ................. 361/704 |
| 6,157,538 | A | * | 12/2000 | Ali et al. ..................... 361/704 |
| 6,347,036 | B1 | * | 2/2002 | Yeager et al. ............... 361/687 |
| 6,359,780 | B1 | * | 3/2002 | McMahan et al. .......... 361/687 |

* cited by examiner

*Primary Examiner*—Boris Chervinsky
(74) *Attorney, Agent, or Firm*—Finnegan, Henderson, Farabow, Garrett & Dunner, L.L.P.

(57) ABSTRACT

Disclosed herein is an electronic apparatus that comprises a housing having an outer wall, a receptacle provided in the housing and having an opening made in the outer wall, and a heat-generating component provided in the receptacle and being removable from the receptacle through the opening. The opening is covered with a removable cover. The cover conceals the heat-generating component. A heat-conducting sheet lies between the cover and the heat-generating component. The heat-conducting sheet thermally connects the heat-generating component to the housing.

16 Claims, 9 Drawing Sheets

ELECTRONIC APPARATUS HAVING A HEAT CONDUCTING SHEET THAT PROMOTE HEAT RADIATION FROM A MEMORY MODULE

CROSS-REFERENCE TO RELATED APPLICATIONS

This application is based upon and claims the benefit of priority from the prior Japanese Patent Application No. 2002-62359, filed Mar. 7, 2002, the entire contents of which are incorporated herein by reference.

BACKGROUND OF THE INVENTION

1. Field of the Invention

The present invention relates to an electronic apparatus that can incorporate, for example, additional memory modules. In particular, the invention relates to a structure that diffuses the heat from memory modules to the housing of the electronic apparatus.

2. Description of the Related Art

Electronic apparatuses such as portable computers have a memory receptacle for holding additional memory modules. The memory receptacle is provided in the bottom of the housing of the electronic apparatus. The receptacle has an opening that is made in the bottom wall of the housing. It is through the opening that additional memory modules can be inserted into, and removed from, the memory receptacle. A cover that can be removed usually closes the opening. The cover usually closes the memory receptacle and protects the memory modules. It is removed from the bottom wall of the housing so that the user may remove the memory modules from, or insert them into, the memory receptacle.

Each memory module has a plurality of electronic components, each incorporating a memory chip. The electronic components may be SDRAMs that operate in DDR (Double Data Rate) mode. In DDR-type SDRAMs, data can be transferred very fast. This means that DDR-type SDRAMs consume much power and generate too large an amount of heat to neglect, while they are operating. If memory modules having a DDR-type SDRAM each are provided in the memory receptacle, the bottom wall of the housing will be locally heated with the heat the DDR-type SDRAMs.

Here arises a problem. In most cases, the memory receptacle is a closed chamber. It is partitioned from the interior of the housing to prevent dust or the like from entering the interior of the housing while the cover remains removed from the bottom wall of the housing. The heat emanating from the SDRAMs may therefore accumulate in the memory receptacle. That part of the bottom wall which lies at the memory receptacle is inevitably heated to a considerably high temperature. Hence, some measures should be taken to enhance the heat radiation from the memory modules set in the memory receptacle.

In conventional electronic apparatuses, the memory receptacle is provided in the narrow gap between the bottom wall of the housing and the printed wiring board provided in the housing. Once memory modules are placed in the memory receptacle, there is left little room for a heat sink that is made of metal and should extend between the cover and the memory modules. Any heat sink of the type hitherto known cannot be used to increase the efficiency of heat radiation from the memory modules.

A heat sink, if arranged between the cover and the memory modules, would close the memory receptacle. It would hinder the replacing of memory modules or the inserting of additional memory modules. It must be removed from the opening made in the bottom wall of the housing before the memory modules are replaced or additional memories are inserted into the memory receptacle. Further, the heat sink must be set in the opening and thermally coupled to the memory modules after the replacing of memory modules or the inserting of additional memory modules.

It would take much time and labor to replace the memory modules or to insert additional memory modules into the memory receptacle.

BRIEF SUMMARY OF THE INVENTION

An embodiment of this invention is to provide an electronic apparatus in which heat can be efficiently diffused from any heat-generating component into the housing, thus preventing a local temperature rise in the housing.

According to one aspect of the invention, there is provide an electronic apparatus which comprises a housing having an outer wall; a receptacle provided in the housing and having an opening at the outer wall; a heat-generating component-contained in the receptacle and being removable from the receptacle through the opening. The opening is covered with a cover that can be removed. The cover conceals the heat-generating component. A heat-conducting sheet is interposed between the cover and the heat-generating component. The heat-conducting sheet thermally connects the housing and the heat-generating component.

The heat-conducting sheet is as thin as a film. It can therefore be interposed between the cover and the heat-generating component, even if the gap between the cover and the heat-generating component is narrow. The heat emanating from the heat-generating component can efficiently diffuse to every part of the housing through the heat-conducting sheet. This prevents a local temperature rise in the housing, particularly at that part of the outer wall at which the receptacle is provided.

Additional features and advantages of the invention will be set forth in the description which follows, and in part will be obvious from the description, or may be learned by practice of the invention. The features and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which re incorporated in and constitute a part of the specification, illustrate embodiments of the invention, and together with the general description given below and the detailed description of the embodiments given below, serve to explain the principles of the invention.

DETAILED DESCRIPTION OF THE INVENTION

A portable computer 1 that is the first embodiment of this invention will be described with reference to FIGS. 1 to 10.

Figure 1:
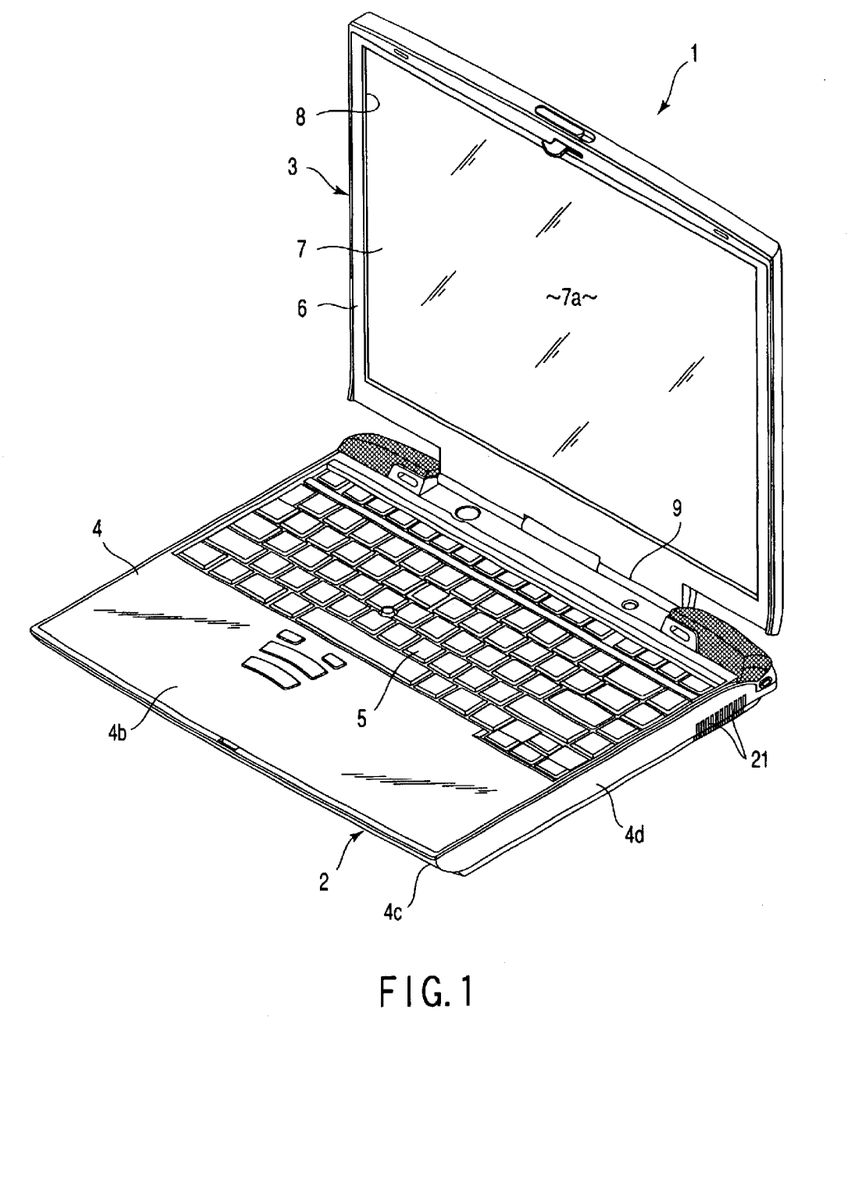
FIG. 1 is a perspective view of a portable computer that is a first embodiment of the present invention.
Figure 2:
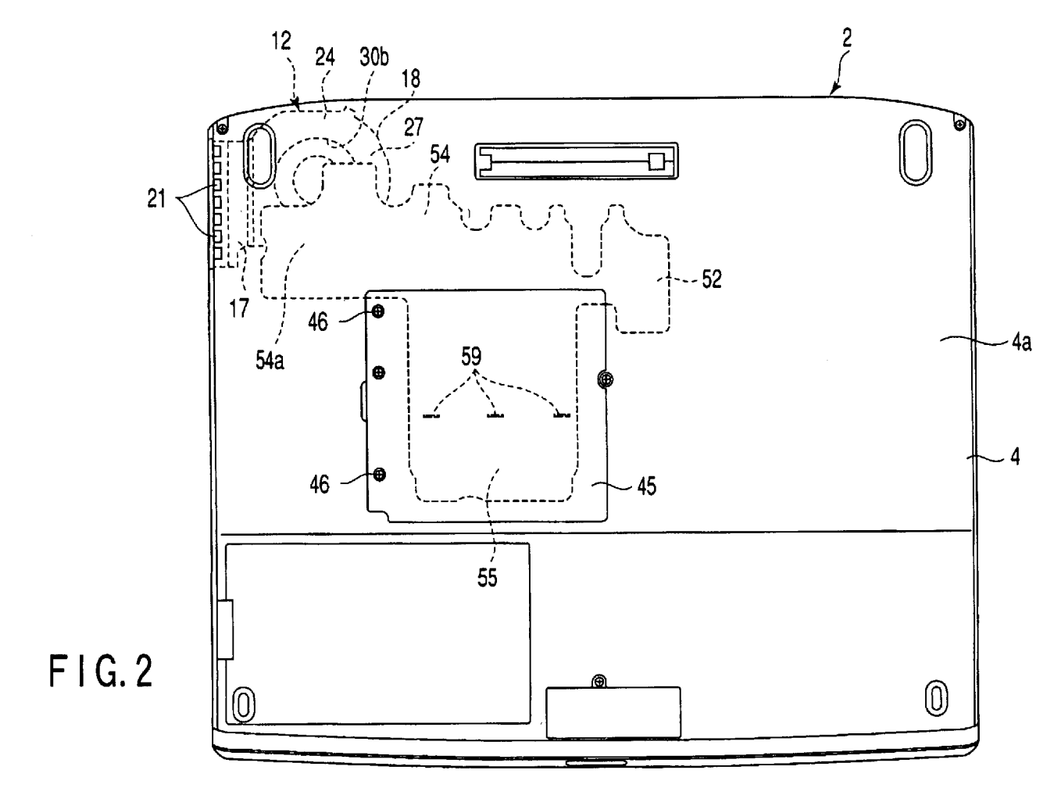
FIG. 2 is a plan view of the portable computer, illustrating the positional relation between the bottom wall of the housing, the cover, and the heat-conducting sheet.

FIGS. 1 and 2 show the portable computer 1, or an electronic apparatus according to the present invention. The portable computer 1 comprises a main body 2 and a display unit 3.

The main body 2 comprises a housing 4 that is shaped like a box and made of synthetic resin. The housing 4 has a bottom wall 4a, a top wall 4b, a front wall 4c, left and right sidewalls 4d, and a rear wall 4e. The bottom wall 4a constitutes an outer wall of the housing 4. A keyboard 5 is mounted on the top wall 4b of the housing 4.

The display unit 3 comprises a display housing 6 and a liquid crystal display (LCD) panel 7. The LCD panel 7 is contained in the display housing 6 and has a display screen 7a. The display screen 7a is exposed through the opening 8 made in the front of the display housing 6. The display housing 6 is coupled to the rear edge of the housing by a hinge device (not shown). Thus, the display unit 3 can be rotated between two positions. At the first position, it covers the top wall 4a and the keyboard 5 from the above. At the second position, it stands upright, exposing the top wall 4b, keyboard 5 and display screen 7a.

Figure 3:
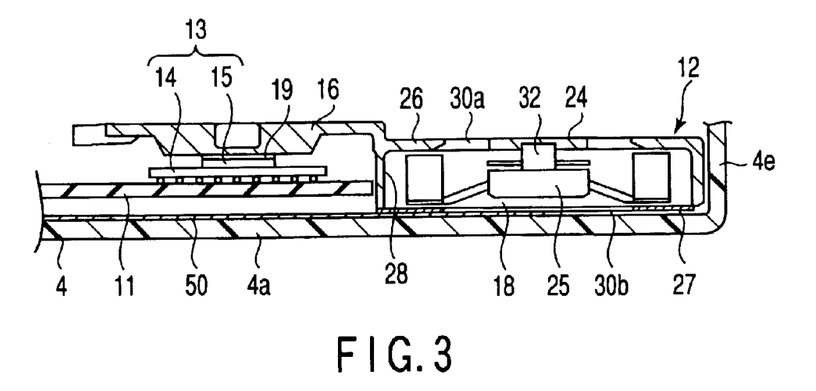
FIG. 3 is a cross-sectional view of the portable computer, depicting the positional relation between the fan device of the cooling unit and the heat-conducting sheet.

As FIG. 3 depicts, the housing 4 contains a printed wiring board 11 and a cooling unit 12. The printed wiring board 11 lies parallel to the bottom wall 4a of the housing 4. A microprocessor 13 is mounted on the rear part of the printed wiring board 11. The microprocessor 13 is, for example, a semiconductor package of BGA type. It has a base substrate 14 and an IC chip 15. The base substrate 14 is soldered to the upper surface of the printed wiring board 11. The IC chip 15 is mounted on the center part of the upper surface of the base substrate 14. The IC chip 15 generates much heat while it is operating. It must be cooled in order to operate reliably.

The cooling unit 12 is designed to cool the microprocessor 13. The cooling unit 12 is arranged in the corner that is defined by the right sidewall 4d and rear wall 4e of the housing 4.

Figure 4:
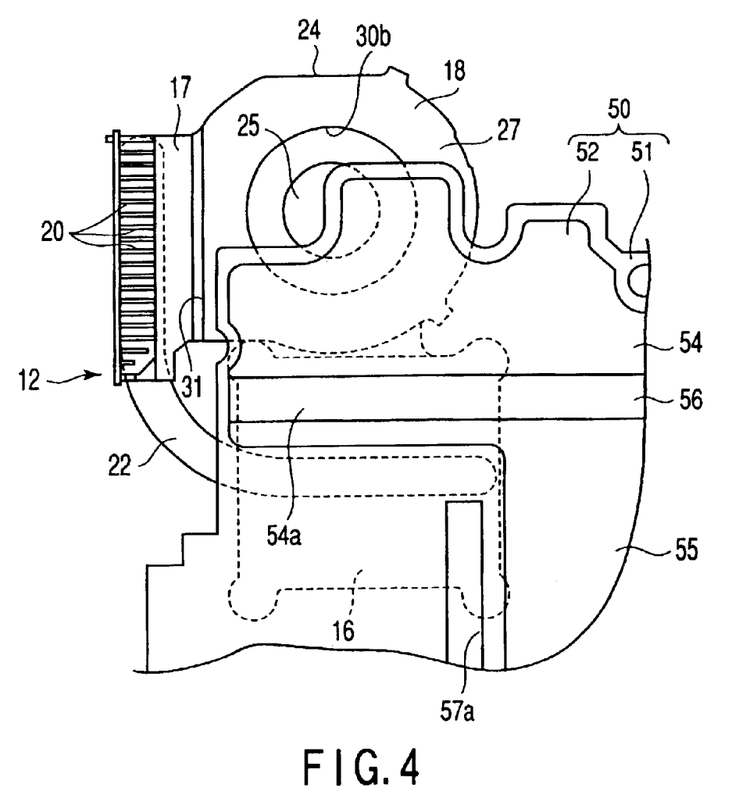
FIG. 4 is a plan view showing the positional relation between the casing of the fan device and the heat-conducting sheet.

As FIGS. 3 and 4 show, the cooling unit 12 comprises a heat-receiving block 16, a heat-radiating block 17, a fan device 18, and a heat pipe 22. The heat-receiving block 16 is made of thermally conductive metal, such as aluminum alloy. It is thermally connected by thermally conductive grease to the IC chip 15 of the microprocessor 13.

The heat-radiating block 17 is made of metal that excels in thermal conductivity, such as aluminum alloy. It has a plurality of heat-radiating fins 20. The heat-radiating fins 20 are spaced apart from one another and positioned parallel to one another. The heat-radiating block 17 extends along the right sidewall 4d of the housing 4. They oppose a plurality of air outlet ports 21 that are made in the right sidewall 4d.

The heat pipe 22 thermally connects the heat-receiving block 16 and the heat-radiating block 17. Therefore, the heat that the block 16 has received from the microprocessor 13 is transferred to the heat-radiating block 17 through the heat pipe 22.

The fan device 18 comprises a casing 24 and an impeller 25. The casing 24 is composed of a casing body 26 and a bottom plate 27. The casing body 26 is made integral with the heat-receiving block 16. The casing body 26 has a circumferential wall 28 that extends downwards. The bottom plate 27 is made of metal that excels in thermal conductivity, such as aluminum alloy. The bottom plate 27 is coupled to the lower edge of the circumferential wall 28 and opposes the inner surface of the bottom wall 4a of the housing 4. Thus, a gap is provided between the bottom plate 27 and the bottom wall 4a.

The casing 24 has two inlet ports 30a and 30b and one outlet port 31. The first inlet port 30a is made in the casing body 26. The second inlet port 30b is made in the bottom plate 27. The outlet port 31 is made in the circumferential wall 28 of the casing body 26. The outlet port 31 opposes the air outlet ports 21 of the housing 4. The heat-radiating block 17 is interposed between the air outlet ports 21 and the outlet port 31.

The impeller 25 is provided in the casing 24. It is arranged between the casing body 26 and the bottom plate 27 and coupled to an electric motor 32, which is supported on the casing 24.

When the motor 32 drives the impeller 25, air is drawn from the housing 4 into the casing 24 through the inlet ports 30a and 30b. The air flows through the outlet port 31 and applied, as cooling air, onto the heat-radiating block 17. The heat-radiating block 17 is therefore cooled. Hence, the heat the IC chip 15 has generated is transferred to the air by virtue of the heat exchange between the IC chip 15 and the block 17. The air is heated and expelled from the housing 4 via the air outlet ports 21.

As seen from FIGS. 5, 6A, 6B and 9, the housing 4 of the main body 2 has a memory receptacle 35. The user of the portable computer 1 can access to the memory receptacle 35. The memory receptacle 35 can holds two memory modules 36, which are components that generate heat while operating. The receptacle 35 is made in the bottom wall 4a of the housing 4. Each memory module 36 comprises a substrate 37 and a plurality of electronic parts 38. The substrate 37 is a rectangular plate, and the electronic parts 38 are mounted on the substrate 37. The substrate 37 has terminals 37a at one end. The electronic parts 38 are, for example, SDRAMs of DDR (Double Data Rate) type. While operating, the SDRAMs of DDR type generate too much heat to neglect.

Figure 5:
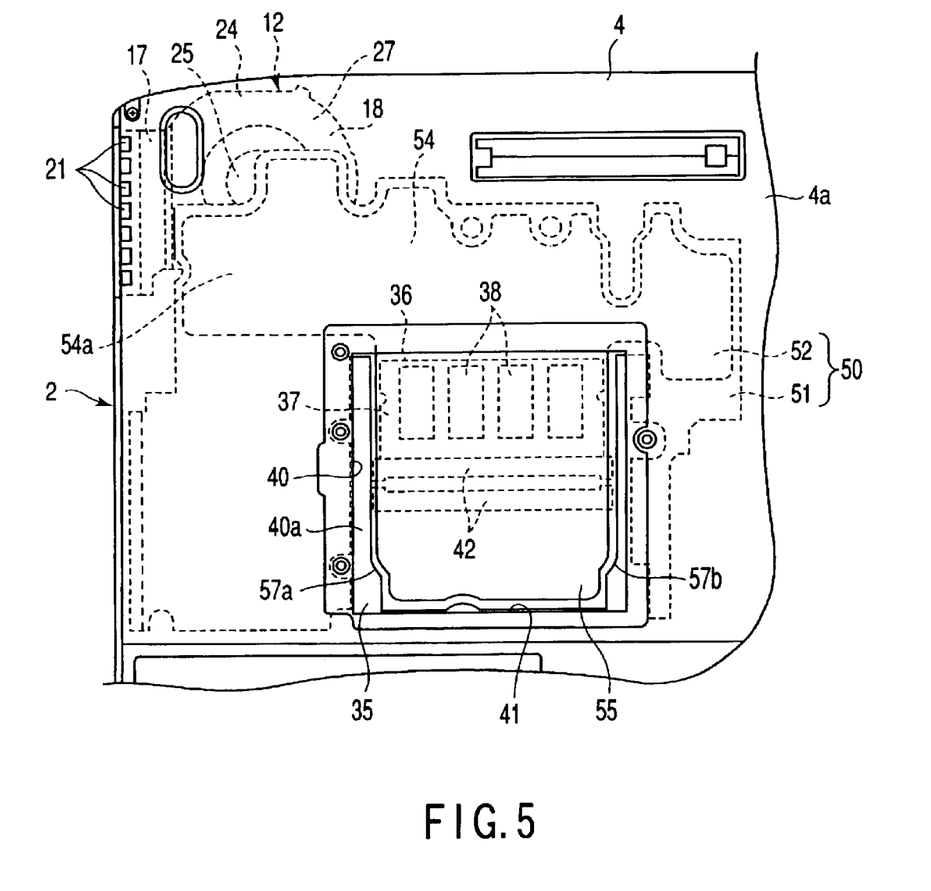
FIG. 5 is a plan view of the portable computer, representing the positional relation between the memory receptacle, the heat-conducting sheet, and the fan device.
Figure 6A:
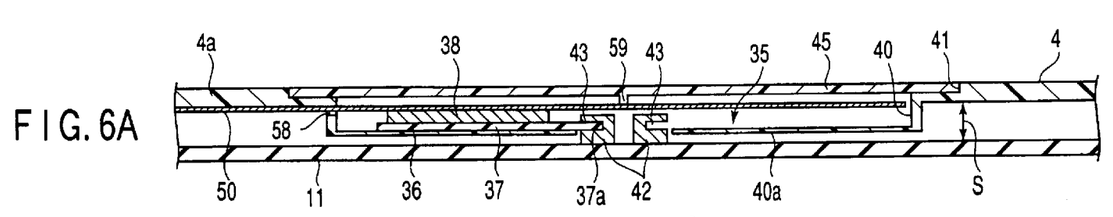
FIG. 6A is a cross-sectional view of the portable computer, illustrating the positional relation between the memory receptacle, the heat-conducting sheet, and a memory module.
Figure 6B:
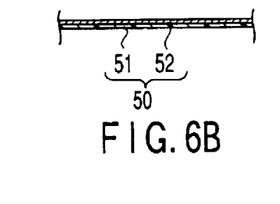
FIG. 6B is a cross-sectional view of the heat-conducting sheet.

The memory receptacle 35 has a recess 40 made in the bottom wall 4a of the housing 4. The recess 40 is located adjacent to the fan device 18 of the cooling unit 12. It is large enough to hold two memory modules 36.

The recess 40 has a rectangular opening 41. It is through the opening 41 that the memory modules 35 can be inserted into and removed from the memory receptacle 35. The opening 41 is made in the bottom wall 4a of the housing 4 and opposes the bottom 40a of the recess 40.

Figure 7:
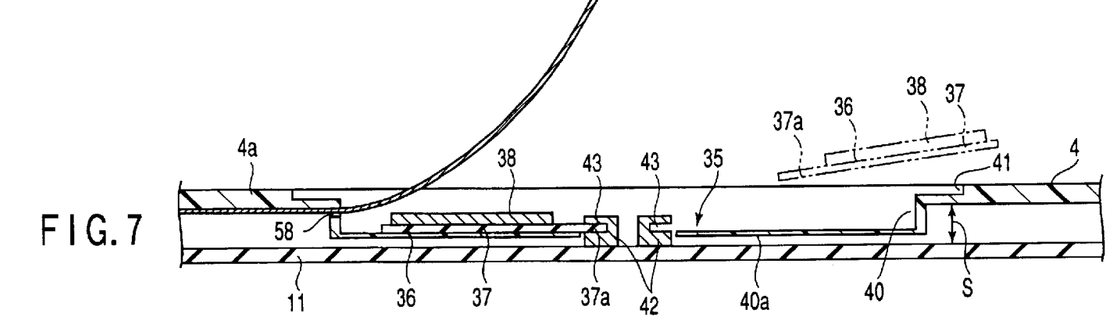
FIG. 7 is a cross-sectional view of the portable computer, depicting the heat-conducting sheet that is bent, exposing the memory module.

FIG. 6A and FIG. 7 show the housing 4, turned upside down, with the bottom wall 4a turned upwards. As can be understood from FIG. 6A, the recess 40 lies in a narrow space S provided between the bottom wall 4a and the printed wiring board 11. The bottom 40a of the recess 40 horizontally extends along the lower surface of the printed wiring board 11. A pair of connectors 42 are mounted on the lower surface of the printed wiring board 11. The connectors 42 extend parallel to each other, in the widthwise direction of the housing 4. They pass through the bottom 40a of the recess 40 and protrude into the middle part of the memory receptacle 35. Each connector 42 has a connection tap 43, into which one terminal 37a of the substrate 37 is removably inserted. As long as the terminals 37a of the substrate 37 remain in the connection taps 43, the electronic parts 38 oppose the opening 41 of the memory receptacle 35.

A cover 45 that can be removed closes the opening 41. The cover 45 is made of synthetic resin. It is a flat plate, closely fitted in the opening 41 that is made in the bottom wall 4a. It is fastened to the bottom wall 4a by means of screws 46, concealing the recess 40 and the memory modules 36. The inner surface of the cover 45 faces the electronic parts 38 held in the memory receptacle 35. A narrow gap is provided between the cover 45 and the electronic parts 38.

As FIGS. 5 to 8 show, a heat-conducting sheet 50 lies on the bottom of the housing 4. The heat-conducting sheet 50 is composed of an insulator film 51 and a metal film 52. The insulator film 51 is made of synthetic resin. The metal film 52 is laid on the insulator film 51. The sheet 50 is a little larger than the memory receptacle 35. It is rigid enough to retain its flat form when not supported at all. Yet can it be easily bent by hand. The metal film 52 is a copper film and therefore excels in heat conductivity. One side of the metal film 52 is covered with the insulator film 51. The other side of the metal film 52 is exposed, not cover with anything.

Figure 8:
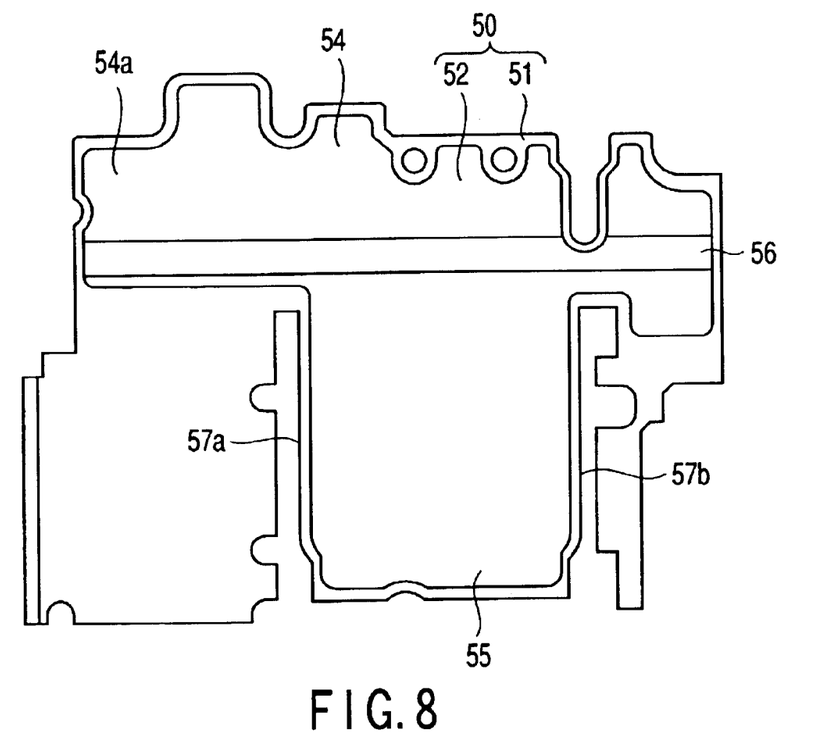
FIG. 8 is a plan view of the heat-conducting sheet.

The metal film 52 of the heat-conducting sheet 50 comprises two parts 54 and 55. The first part 54 is a band that extends in the widthwise direction of the housing 4 and lies at the back of the memory receptacle 35. Double-sided adhesive tape 56 bonds the first part 54 to the inner surface of the bottom wall 4a. The first part 54 of the metal film 52 contacts, at the other surface, the inner surface of the bottom wall 4a. Hence, the heat-conducting sheet 50 is thermally connected to the housing 4.

As seen from FIGS. 2 and 5, the first part 54 of the metal film 52 have an end portion 54a located adjacent to the left sidewall 4d of the housing 4. The end portion 54a lies below the bottom plate 27 of the casing 24. The end portion 54a and the bottom plate 27 clamp the insulator film 51. Therefore, the first part 54 of the metal film 52 is thermally connected not only to the housing 4, but also to the casing 24.

The second part 55 of the metal film 52 is rectangular and as large as the recess 40. As FIG. 8 shows, the insulator film 51 covering one side of the metal film 52 has slits 57a and 57b. The slits 57a and 57b extend parallel to each other and located on the sides of the second part 55 of the metal film 52. The slits 57a and 57b open at the front edge of the insulator film 51. The second part 55 is, therefore, separated from the insulator film 51; it can be elastically bent.

The second part 55 of the metal film 52 is guided into the recess 40 through a hole 58 made in the bottom wall 4a of the housing 4. The hole 58 is located outside the recess 40. The second part 55 lies in the opening 41 of the recess 40. The second part 55 is interposed between the cover 45 and the electronic parts 38 as long as the memory module 36 remains in the recess 40. At the second part 55 of the metal film 52, the other side of the metal film 52 opposes the inner surface of the cover 45 and the first side of the metal film 52 opposes the insulator film 51, which in turn faces the electronic parts 38.

As FIGS. 2 and 6A depict, a plurality of projections 59 are provided on the inner surface of the cover 45. The projections 59 lie on the center part of the cover 45, arranged in a row and spaced part in the widthwise direction of the housing 4. They protrude toward the bottom wall 40a of the recess 40 and contact the second part 55 of the metal film 52. The second part 55 pushes the insulator film 51 onto the electronic parts 38 held in the memory receptacle 35. This ensures the thermal connection of the second part 55 to the electronic parts 38. Thus, the second part 55 of the metal film 52 functions as the heat-receiving section of the heat-conducting sheet 50.

In the portable computer 1 of the structure described above, the electronic parts 38 of the memory module 36 generate heat while operating to write and read data. The heat-conducting sheet 50 interposed between the electronic parts 38 and the cover 45 covering these parts 38 is a flexible component that is as thin as film. It can therefore be arranged in the narrow space provided between the cover 45 and the electronic parts 38. The second part 55 of the heat-conducting sheet 50 is thus thermally connected to the electronic parts 38.

The heat that the electronic parts 38 have generated is transferred from the second part 55 of the metal film 52 to the first part 54 of the metal film 52. As indicated above, the first part 54 is bonded to the inner surface of the bottom wall 4a of the housing 4 and thermally connected to the bottom wall 4a. Therefore, the heat transferred to the first part 54 of the metal film 52 diffuses via the bottom wall 4a into the other walls of the housing 4.

In the present embodiment, the end portion 54a of the first part 54 of the metal film 52 is thermally connected to the bottom plate 27 of the casing 24 of the fan device 18. Part of the heat transferred to the first part 54 of the metal film 52 is dissipated into the casing 24. This means that the casing 24 works as a heat sink for the electronic parts 38.

In addition, the cooling air generated by the impeller 25 cools the casing 24. The cooling air takes the heat transferred from the electronic parts 38 to the casing 24 via the first part 54, away from the housing 4.

As a result, the heat emanating from the electronic parts 38 is scarcely accumulated in the memory receptacle 35. This prevents a local temperature rise at that part of the bottom wall 4a in which the memory receptacle 35 is provided. The surface temperature of the housing 4 therefore remains so low that the user does not feel the housing 4 is hot when he or she touches the housing 4.

It will be explained how to set an additional memory module in the memory receptacle 35 and to replace a memory module set in the receptacle 35 with another memory module.

Figure 9:
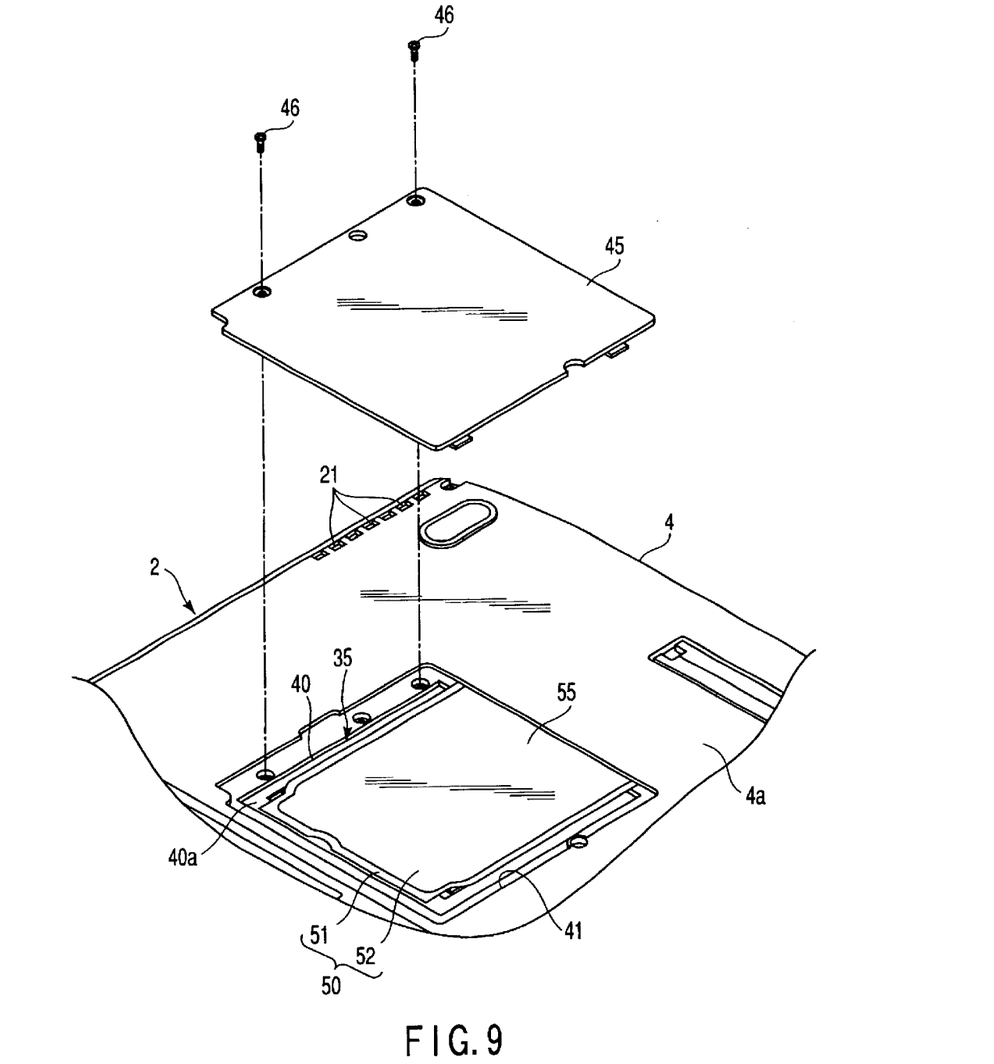
FIG. 9 is a perspective view of the portable computer, showing the heat-conducting sheet that is exposed because the cover has been removed from the bottom wall of the housing.

First, the cover 45 is removed from the bottom wall 4a of the housing 4, thus exposing the opening 41 of the recess 40 is illustrated in FIG. 9. As a result, the second part 55 of the metal film 52 of the heat-conducting sheet 50 is exposed through the opening 41.

Figure 10:
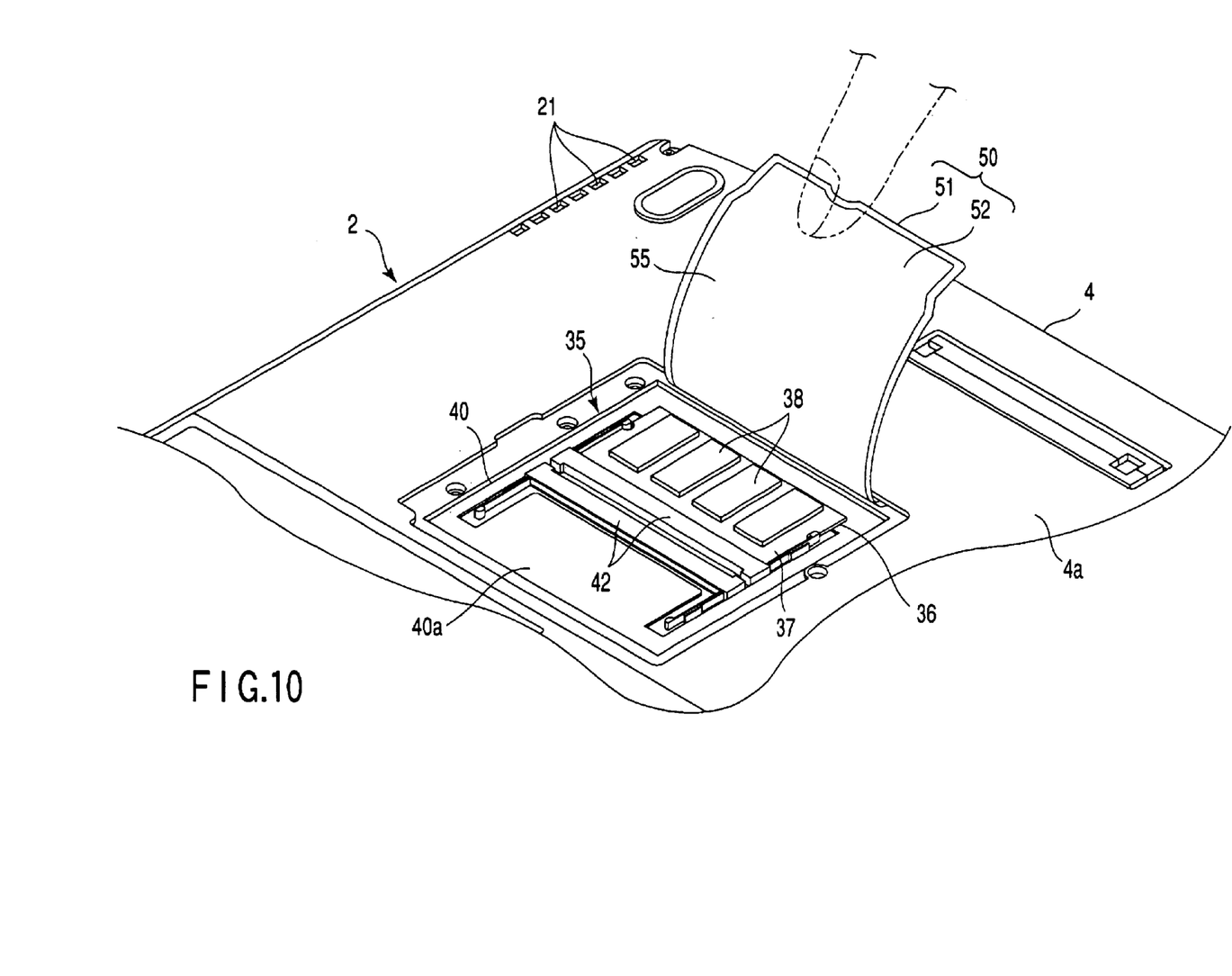
FIG. 10 is a perspective view of the portable computer, displaying the heat-conducting sheet pulled up and bent, thus exposing the memory module.

Next, the user holds the free edge of the heat-conducting sheet 50 with the forefinger and pulls it up, bending the sheet 50 away from the recess 40 as is illustrated in FIG. 10. Thus, the memory receptacle 35 is easily exposed. Then, an additional memory module 36 can be set in the receptacle 35 or the memory module 35 can be replaced with another. The sheet 50 would not hinder the process of placing the additional module 36 in the receptacle 35 or replacing the module 36 with another module. It is easy to set the additional module in the receptacle 35 and replace the module with another module.

After the additional memory module 36 is set in the receptacle 35 or the module 36 is replaced with another, the user releases the heat-conducting sheet 50. The sheet 50 straightens and falls to the opening 41 of the recess 40, closing the memory receptacle 35. The cover 45 is set in the opening 41 and secured, with the screws 46, to the bottom wall 4a of the housing 4. Once the cover 45 is thus secured to the bottom wall 4a, the heat-conducting sheet 50 remains pressed onto the insulator film 51, which contacts the electronic parts 38.

Thus, the heat-conducting sheet 50 is thermally connected to the electronic parts 38 when the cover 45 is secured to the housing 4. It does not take a long time or much labor to set the additional memory module 36 in the receptacle 35 or to replace the memory module 36 with another module.

Figure 11:
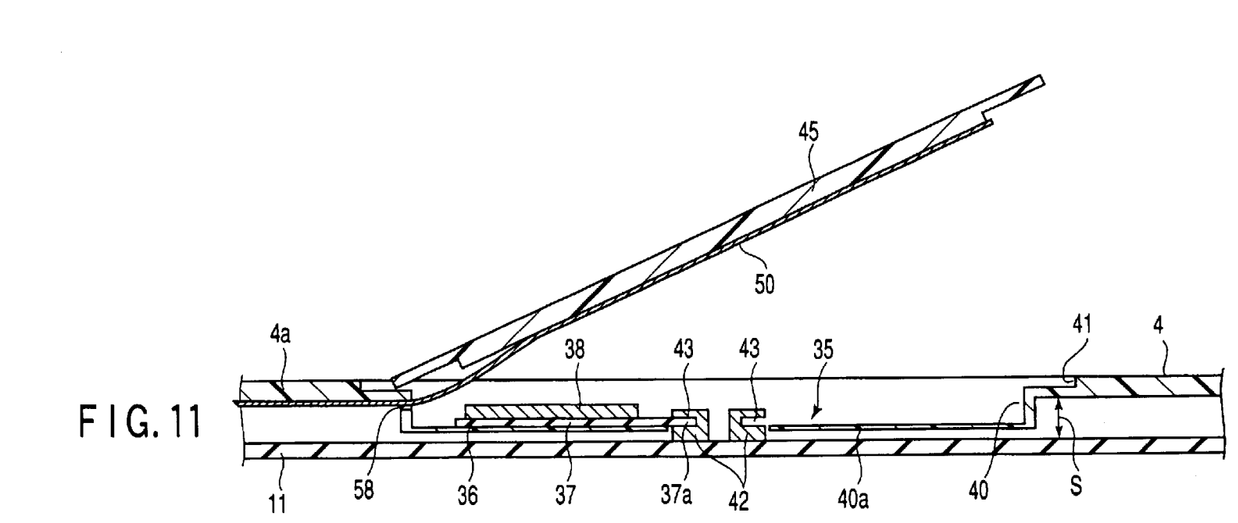
FIG. 11 is a cross-sectional view of a portable computer according to a second embodiment of the invention, showing a memory module exposed.

The present invention is not limited to the first embodiment described above. FIG. 11 shows the second embodiment of the invention.

The second embodiment is a portable computer 1, too. It is identical in structure to the first embodiment, except that the cover 45 is fixed to that part of the heat-conducting sheet 50 which is equivalent to the second part 55 of the metal film 52.

In the structure shown in FIG. 11, the positional relation between the cover 45 and the second part 55 of the metal film 52 remains unchanged. Hence, the second part 55 of the metal film 52 takes a precise position between the cover 45 and the electronic parts 38 when the cover 45 is secured to the bottom wall 4a of the housing 4. This ensures the thermal connection of the heat-conducting sheet 50 to the electronic parts 38 of the memory module 36.

The cover 45 remains coupled to the housing 4 by the heat-conducting sheet 50. Therefore, the cover 45 would not go astray.

Figure 12:
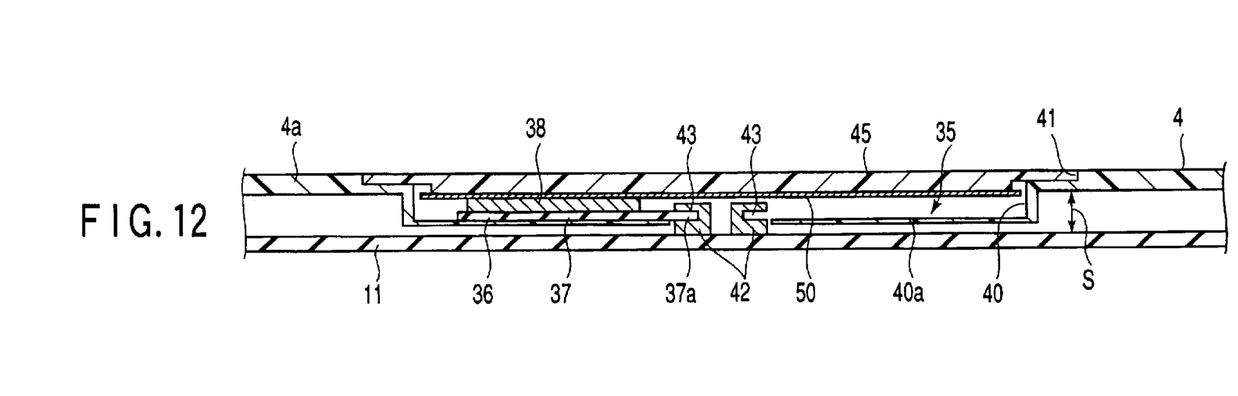
FIG. 12 is a cross-sectional view of a portable computer according to a third embodiment of the invention, representing the positional relation between the memory receptacle, the heat-conducting sheet, and a memory module.

FIG. 12 shows a portable computer that is the third embodiment of the invention.

In the third embodiment, the heat-conducting sheet 50 lies on only the inner surface of the cover 45. The sheet 50 is large enough to cover the entire inner surface of the cover 45 and is laid upon the inner surface of the cover 45. The heat-conducting sheet 50 contacts the electronic parts 38 of the memory module 36 held in the receptacle 35.

In the third embodiment, the heat-conducting sheet 50 is interposed between the cover 45 and the electronic parts 38 as long as the cover 45 remains fastened to the bottom wall 4a of the housing 4. The heat emanating from the electronic parts 38 is therefore conducted to the cover 45 through the heat-conducting sheet 50. The heat then diffuses from the cover 45 via the bottom wall 4a into the other walls of the housing 4.

Therefore, the heat that the electronic parts 38 have generated is scarcely accumulated in the memory receptacle 35. This prevents a local temperature rise at that part of the bottom wall 4a in which the memory receptacle 35 is provided.

In the first embodiment, the heat-conducting sheet has one metal film that is exposed at one side. Alternatively, the heat-conducting sheet may be composed of two metal films and two insulator films that sandwich and cover the metal films.

Moreover, the electronic apparatus according to the present invention is not limited to a portable computer. Rather, it may be a PDA (Personal Digital Assistant) or any other type of a data terminal.

Additional advantages and modifications will readily occur to those skilled in the art. Therefore, the invention in its broader aspects is not limited to the specific details and representative embodiments shown and described herein. Accordingly, various modifications may be made without departing from the sprint or scope of the general inventive concept as defined by the appended claims and their equivalents.

What is claimed is:

1. An electronic apparatus comprising:
   a housing including a wall having an opening;
   a receptacle provided in the housing;
   a heat-generating component contained in the receptacle and removable from the receptacle through the opening;
   a cover covering the opening, concealing the heat-generating component and removable from the opening; and
   a heat-conducting sheet including a first part thermally connected to the wall, and a second part positioned at the opening, the second part being thermally connected to the heat-generating component in the receptacle when the opening is closed with the cover.

2. An electronic apparatus according to claim 1, wherein the heat-conducting has an insulator film and a metal film laid on the insulator film.

3. An electronic apparatus according to claim 2, wherein the metal film is thermally connected to both the wall and the heat generated component.

4. An electronic apparatus according to claim 1, wherein the housing incorporates a fan device having a casing made of metal, and the first part of the heat conducting sheet is thermally connected to the casing.

5. An electronic apparatus according to claim 1, wherein the cover has projections which push the heat-conducting sheet onto the heat-generating component.

6. An electronic apparatus according to claim 1, wherein the second part of the heat-conducting sheet is secure to the cover.

7. An electronic apparatus according to claim 1, wherein the heat-generating component has a substrate and an electronic part which is mounted on the substrate and which generate heat while operating.

8. An electronic apparatus comprising:
   a housing including a wall having an opening;
   a user-access region provided in the housing;
   a function component provided in the user-access region and removable from the user-access region through the opening, the function component generating heat while operating;
   a cover covering the opening, concealing the function component and removable from the opening; and
   a heat-conducting sheet thermally connected to the wall and having a heat-receiving part positioned at the opening the heat-receiving part being thermally connected to the function component in the user-access region when the opening is closed with the cover.

9. An electronic apparatus according to claim 8, wherein the cover has projections which push the heat-receiving part onto the function component.

10. An electronic apparatus according to claim 8, wherein the housing incorporates a fan device having a casing made of metal, and the heat-conducting sheet is thermally connected to the casing.

11. An electronic apparatus according to claim 8, wherein the function component is a memory module which has a plurality of electronic parts which generate heat while operating.

12. An electronic apparatus comprising:
a housing including a bottom wall in which an opening is formed;
a printed wiring board provided in the housing and opposing the bottom wall;
a memory receptacle provided between the opening and the printed wiring board;
a memory module provided in the memory receptacle, removable from the memory receptacle through the opening and having an electronic part which generates heat while operating;
a cover covering the opening, concealing the memory module and removable from the opening; and
a heat-conducting sheet thermally connected to the bottom wall and having a heat-receiving part positioned at the opening, the heat-receiving part being thermally connected to the memory module in the memory receptacle when the opening is closed with the cover.

13. An electronic apparatus comprising:
a housing including a wall in which an opening is formed;
a receptacle provided in the housing;
a heat-generating component contained in the receptacle and removable from the receptacle through the opening;
a cover covering the opening, concealing the heat-generating component and removable from the opening; and
a heat-conductive sheet including a first part and a second part, the first part being thermally connected to a part of the wall outside the opening, and the second part being positioned at the opening and being thermally connected to the heat-generating component contained in the receptacle when the opening is closed with the cover.

14. An electronic apparatus according to claim 13, wherein when the cover is removed from the opening, the second part of the heat-conductive sheet is movable in a direction that exposes the receptacle through the opening.

15. An electronic apparatus according to claim 13, wherein the second part of the heat-conductive sheet is interposed between the heat-generating component contained in the receptacle and the cover when the opening is closed with the cover.

16. An electronic apparatus according to claim 13, wherein the first part of the heat-conductive sheet is in contact with an inner surface of the wall.

* * * * *

UNITED STATES PATENT AND TRADEMARK OFFICE
CERTIFICATE OF CORRECTION

PATENT NO. : 6,728,105 B2 Page 1 of 1
DATED : April 27, 2004
INVENTOR(S) : Tanaka It is certified that error appears in the above-identified patent and that said Letters Patent is hereby corrected as shown below:

<u>Column 8,</u>
Line 34, change "heat-conducting has" to -- heat-conducting sheet has --.
Line 65, change "opening the" to -- opening, the --.

Signed and Sealed this

Twenty-third Day of August, 2005

JON W. DUDAS
*Director of the United States Patent and Trademark Office*